BALL DETENT COUPLING DEVICE WITH RING SHAPED FRICTION MEANS

Original Filed Aug. 3, 1959

United States Patent Office 3,170,362
Patented Feb. 23, 1965

3,170,362
BALL DETENT COUPLING DEVICE WITH RING SHAPED FRICTION MEANS
Charles Mewse, Welwyn Garden City, England, assignor to Avdel Limited, a British company
Original application Aug. 3, 1959, Ser. No. 831,388, now Patent No. 3,068,737, dated Dec. 18, 1962. Divided and this application Oct. 26, 1962, Ser. No. 233,410
Claims priority, application Great Britain, Aug. 8, 1958, 25,629/58
1 Claim. (Cl. 85—5)

This application is a division of my copending application Serial No. 831,388, filed August 3, 1959, now Patent No. 3,068,737.

This invention relates to quick release fasteners of the kind commonly used for connecting sheets or other articles having registering apertures, comprising a radially apertured tubular member, a locking elements(s) accommodated in the radial aperture(s) and an operating member formed with cam-like part(s) within the tubular member to move the locking elements into locking or released position. The fastener may be pushed through registering apertures in the articles to be fastened together, or be withdrawn from the articles when the cam groove on the operating member is in alignment with the radial apertures in the tubular member.

According to the invention such a quick release fastener comprises a radially apertured tube, at least one locking member movable in a radial aperture, an operating member which is deformed transversely of its body and is movable within the tube to cause the locking member to protrude outwardly from or to allow it to recede inwardly into the tube, and means introducing friction between the operating member and the tube.

According to another feature of the invention a quick release fastener of the kind referred to above is provided with a friction element restraining the movement of the operating member relative to the radially apertured tube.

According to another feature of the invention a quick release fastener comprises a headed tube carrying at least one radially movable locking member and an operating member slideably mounted within said tube and being operable to move said locking member(s) into and out of the locking position, the operating member carrying a friction element engaging the inner surface of the tube and restraining the operating member against movement and holding it frictionally in the locking or release position.

According to a further feature of the invention the head of the tube, in which the operating member is movable axially, is formed with an internal annular groove into which the friction element expands in the manner of a latch when the operating member is moved into the locking position.

Figure 1:
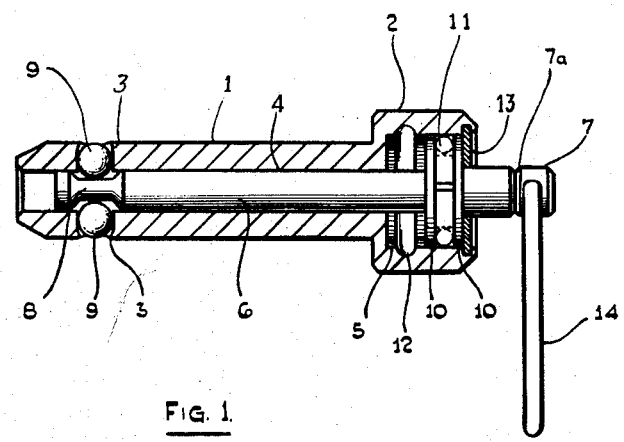
Figure 2:
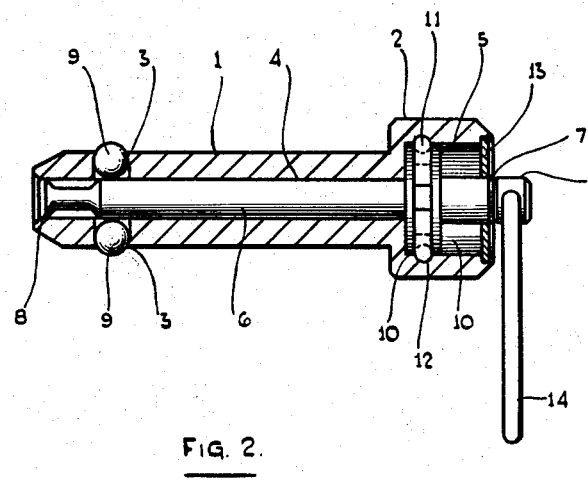

An embodiment of the invention will now be described by way of example with reference to the accompanying drawings in which:

FIG. 1 is a view in sectional elevation of the invention showing the fastener in released position, and FIG. 2 is a view similar to that of FIG. 1 showing the fastener in locked position.

The fastener illustrated in the drawing comprises a tubular member 1 having a head 2 of an enlarged diameter at its outer end and two radial passages 3 near its opposite end. The tubular member 1 is formed with a central bore 4 which is enlarged at 5 within the head 2. The bore 4 communicates with the radial passages 3. Housed within the bore 4 is an operating member in the form of a pin 6 slideably arranged therein. The operating member 6 has a head or knob 7 at its outer end and a cam groove 8 near its opposite end. The head 7 of the operating member 6 is formed intermediate its length with a circumferential groove 7a. The cam groove 8 co-operates with locking elements such as balls 9 which are movable in radial passages 3. When the cam groove 8 is in register with the radial passages 3 the balls 9 are allowed to recede within the tubular member 1, but on movement of the operating member 6 the cam groove 8 causes the balls to protrude outwardly from the external surface of the tubular member 1, from where the balls 9 cannot escape as the radial passages 3 have reduced diameter at the surface of the tubular member 1. The operating member 6 has an enlarged portion within the enlarged bore of head 2 and including two annular flanges 10 which are spaced from each other at a distance sufficient for accommodation of a friction element 11 between them. The friction element 11 is of annular or ring-like shape, the peripheral surface of which engages frictionally the inner surface of the enlarged head 2. The inner surface of the head 2 is formed with an annular groove 12. The location of this groove 12 within the head 2 is determined by the length of the stroke of the friction element 11 within the head 2 of the tubular member 1, which coincides with the movement of the operating member 6 from release into locking position. When the friction element 11 reaches the groove 12 at the end of its stroke it expands into the groove 12 (see FIG. 2). An apertured disc 13 is secured on the outer end of the head 2 preventing the withdrawal of the operating member 6 and of the friction element 11 carried thereby from the tubular member 1; the disc 13 serves also as a dust cover. A ring 14 is affixed to the knob 7 the purpose of which will become clearer as the description proceeds.

In use the fastener which is shown in FIG. 1 in released position is inserted into apertured articles (not shown) to be secured together, until the head of the tubular member 1 abuts against the foremost article, which may be a plate or the like, the knob 7 of the operating member 6 together with the frictional element 11 is then pushed against the frictional resistance of the element 11 allowing this element to expand into the groove 12 when the operating member 11 is brought into the locking position thus providing lodgment against accidental unlocking of the operating member 6 (see FIG. 2). In this position the circumferential groove 7a on the plunger is flush with the disc 13 thus indicating to the operator that the fastener is in the locked position.

For releasing the operating member 6 a straight pull is applied to the ring 14 which causes the friction element 11 to disengage from the groove 12 to move to the position shown in FIG. 1 in which the cam groove 8 on the operating member 6 is in register with the balls 9. The fastener may then be withdrawn.

I claim:
A connecting device comprising:
a tube having an axial bore and an enlarged head at one end thereof and at least one radial aperture spaced from said head, said head having an enlarged bore concentric with said tube and at least one annular recess formed in the inside of said enlarged bore adjacent the junction of said tube and head;
a cover piece closing the outer end of said enlarged bore and having an aperture formed at the center thereof;
a locking member movable in said radial aperture;
an operating member axially slidably supported within said tube for movement between a locking position and a release position;
cam means on said operating member operative to cause said locking member to protrude outwardly from said radial aperture upon said movement of said operating member to said locking position within said tube, and to allow said locking member to recede inwardly into the tube upon movement of said operating member to said release position, said operating member having an intermediate portion located in and positioned for movement within said enlarged bore of said head and a head portion passing through said aperture of said cover piece to form an operating knob by which said operating member may be moved between said locking position and said release position, said intermediate portion having spaced apart radially extending annular flanges defining an annular groove therebetween;

and friction means for resisting movement of said operating member comprising a ring-shaped resilient member located within said groove and movable with the intermediate portion of said operating member and contained entirely within the enlarged bore of said head, said resilient member exerting an outward pressure against the inner surface of said bore and receivable in said annular recess to retain said operating member against movement at least when it is in said locking position.

References Cited by the Examiner

UNITED STATES PATENTS

| | | |
|---|---|---|
| 2,402,925 | 6/46 | Spooner. |
| 3,069,191 | 12/62 | Depew. |

FOREIGN PATENTS

| | | |
|---|---|---|
| 747,277 | 1/45 | Germany. |
| 555,374 | 8/43 | Great Britain. |
| 402,225 | 2/43 | Italy. |

EDWARD C. ALLEN, *Primary Examiner.*

M. HENSON WOOD, JR., *Examiner.*